United States Patent [19]
Inagaki et al.

[11] 3,838,243
[45] Sept. 24, 1974

[54] METHOD AND APPARATUS FOR CONTROLLING ARC IN GAS SHIELD ARC WELDING

[75] Inventors: Michio Inagaki; Akira Okada, both of Tokyo, Japan

[73] Assignee: National Research Institute for Metals, Tokyo, Japan

[22] Filed: Dec. 29, 1972

[21] Appl. No.: 319,732

[52] U.S. Cl. ................................. 219/122, 219/75
[51] Int. Cl. ........................................... B23k 9/00
[58] Field of Search ....... 219/74, 75, 122, 123, 124, 219/121 R, 137, 121 P

[56] References Cited
UNITED STATES PATENTS

| | | | |
|---|---|---|---|
| 1,638,336 | 8/1927 | Himes | 219/122 X |
| 1,711,151 | 4/1929 | Lincoln | 219/74 |
| 3,324,278 | 6/1967 | Jackson | 219/74 |
| 3,484,575 | 12/1969 | Cunningham | 219/121 R X |
| 3,534,388 | 10/1970 | Takakiyo Ito et al. | 219/74 X |
| 3,632,952 | 1/1972 | Rotolico et al. | 219/121 P X |

FOREIGN PATENTS OR APPLICATIONS

| | | | |
|---|---|---|---|
| 402,910 | 12/1933 | Great Britain | 219/74 |

*Primary Examiner*—C. L. Albritton
*Attorney, Agent, or Firm*—Sherman & Shalloway

[57] ABSTRACT

In a gas shield arc welding, a stream of a control gas is blown against the end of an electrode generating arc to deflect the arc in the direction of the control gas jet stream. An arc-generating position of a joint to be welded is controlled by changing the momentum and/or direction of the control gas jet stream.

10 Claims, 11 Drawing Figures

(A-1)　　　(A-2)

(B-1)　　　(B-2)

(C-1)　　　(C-2)

METHOD AND APPARATUS FOR CONTROLLING ARC IN GAS SHIELD ARC WELDING

This invention relates to a method and an apparatus for controlling an arc generating position of a joint to be welded in gas shield arc welding by deflecting the arc using a control gas jet stream.

It is necessary in arc welding to concentrate a heat energy of arc on a predetermined part of the joint to be welded, or distribute it to a predetermined area, or disperse it broadly by inclining a welding torch or vibrating it. This operation of the welding torch brings about the following effects.

1. The weld penetration shape can be varied.
2. The occurrence of undercuts can be prevented.
3. Even joints of different thickness can be welded, and also welding can be performed even on an edge preparation whose precision is not so good.
4. Different kinds of material can be welded without weld defects.
5. Thin plates can be welded without burnthrough.

Thus, in order to concentrate the heat energy on the joint to be welded or disperse it, a procedure of inclining a welding rod or torch or a weaving operation is required in manual welding, and these operations require a considerable amount of skill. An automatic welding apparatus requires a mechanism for inclining or vibrating the welding torch.

Of late, there has been developed a method of changing the arc-generating position of a joint to be welded using magnetic field without the need for mechanically moving a welding device itself. This method is described, for example, in Welding Research Supplement to the Welding Journal, June 1962. According to this method, a magnetic field is exerted in a direction across a welding arc to exert the force according to the Fleming's Law of Left Hand on the arc and thereby deflect the arc in that direction. The arc-generating position of the joint to be welded can be controlled by changing the intensity or direction of the magnetic field. In order to perform this controlling method using a magnetic field, the welding torch must be provided with a large heavy electromagnetic coil and a core. Furthermore, when this method is employed, the shape of the arc is liable to change and the arc is unstable.

This invention provides a method and an apparatus for controlling an arc-generating position of a joint to be welded in gas shield arc welding by deflecting the arc using a control gas jet stream in addition to the shield gas. According to the present invention, a control gas jet stream is caused to flow obliquely to an electrode past its end, thereby to deflect a welding arc with respect to the electrode and change the arc-generating position of the joint to be welded. When the control gas jet stream is caused to flow obliquely with respect to the electrode past the end of the electrode, the arc is deflected substantially in the direction of the control gas jet stream. Since the arc is made stiff by the thermal pinch effect of the control gas jet stream, it is very stable.

In the apparatus of this invention, the control gas nozzle is provided obliquely to the electrode so that its axial direction goes towards the end of the electrode. The arc can be vibrated by changing the rate of flow of the control gas and/or the angle of the control gas nozzle to the electrode. It is also possible to rotate the arc by rotating the control gas nozzle about the electrode rod as a center.

It is an object of this invention to provide a new method of controlling an arc using a control gas jet stream in gas shield arc welding.

Another object of this invention is to provide an apparatus for controlling an arc which is of a simple structure, light in weight, and accurate.

The invention will be described in greater detail by reference to the accompanying drawings in which:

FIG. 1 shows schematic views illustrating various relations between the position of the control gas nozzle and the shape of the arc, in which (A-1) and (A-2) show the case of the control gas being applied to a portion between the end of the electrode and the joint to be welded, (B-1) and (B-2) show the instance of the control gas being applied onto the joint to be welded, and (C-1) and (C-2) shows the instance of the control gas being applied to the end of the electrode in accordance with this invention;

First, the description will be directed to the application of the present invention to the non-consumable electrode type inert gas arc welding (TIG arc welding) based on direct current straight polarity (electrode negative).

Figure 1:
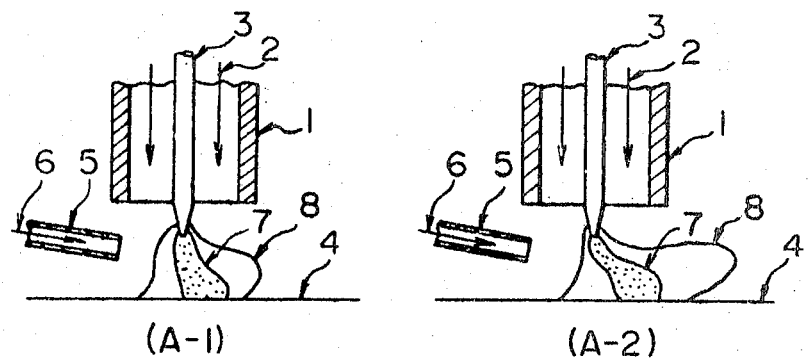
Figure 1:
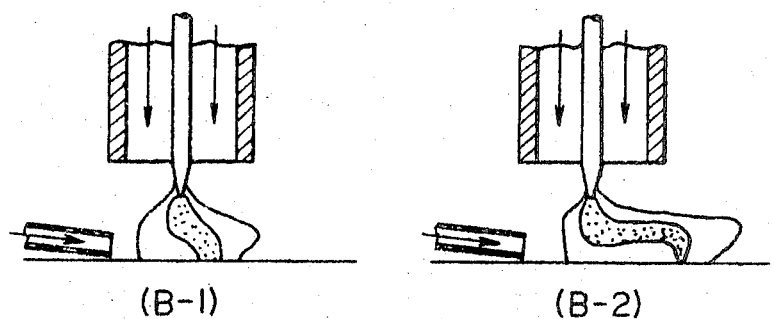
Figure 1:
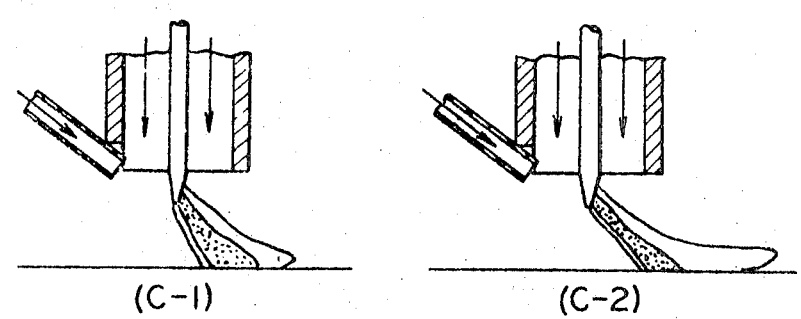

FIG. 1 schematically shows the results of an experiment which was performed in regard to the position and direction of the control gas nozzle for deflecting a welding arc by a control gas. Arc was generated between a non-consumable electrode 3 and the surface 4 of a joint to be welded in an atmosphere of a shield gas 2 from a shield gas nozzle 1. A control gas 6 was jetted out against the arc from a control gas nozzle 5 to change the position and direction of the control gas nozzle. The state of the arc was examined. The drawings in FIG. 1 were prepared by sketching photographed conditions. The arc separated into a central portion 7 of arc plasma having a high current density and a strong brightness and a peripheral portion 8 of arc plasma having a weak brightness. The welding current was 100 A and the arc voltage was 20 V. Argon gas was used both as the shield gas 2 and the control gas 6. The flow rate of the shield gas was 10 liters/min., and the flow rate of the control gas was 3 liters/min. for (A-1), (B-1) and (C-1), and 6 liters/min. for (A-2), (B-2) and (C-2). Reference numerals were omitted in the drawings (B) and (C) as they were the same as those used in drawing (A). The inside diameter of the control gas nozzle 6 was made sufficiently smaller than that of the shield gas nozzle 1 so as not to disturb the shield gas greatly by the control gas jet strea. In this experiment, the inside diameter of the shield nozzle was 12 mm, and the inside diameter of the control nozzle was 2.4 mm.

(A-1) and (A-2) show the instance of the control gas 6 being applied to a portion of the arc plasma 7 between the end of the electrode and the joint to be welded 4. As is seen from the drawings, the central portion 7 of the arc plasma is not so much deflected, and when the flow rate of the control gas is increased, only the peripheral portion 8 of the arc plasma blows greatly in the transverse direction. Consequently, the arc is disturbed, and becomes unstable. (B-1) and (B-2) show the state of arc which is observed when the control gas is directly applied to the vicinity of an arc-generating position (anode point) on the surface 4 of the joint to be welded. The anode point moves in this case, but the arc bends zigzag showing great unstability. If the flow rate of the control gas is increased at this time, the arc may at times be extinguished.

(C-1) and (C-2) show examples in accordance with this invention, which describe the case of the control gas being applied so that the control gas stream 6 passed the end of the electrode 3. Consequently, as is seen from the drawings, arc is generated deflectively at the end of the electrode and in a straight line fashion, reaches the anode point, that is, the arc-generating position of the joint to be welded. This is considered to be due to the fact that by the thermal pinch effect caused by the control gas, stiffness was imparted to the arc. Both the central part 7 and the peripheral part 8 were not disturbed but were very stable. If the flow rate of the control gas is about 6 liters/min. as in drawing (C-2), the peripheral portion 8 of the arc plasma stretches too long in the direction of the control gas stream. Therefore, for proper control of the welding arc, the flow rate of the control gas under the above-mentioned experimental conditions is sufficiently 3 liters/min. in the case of (C-1).

Thus, local application of the control gas from the side of the arc plasma does not so much cause the deflection of the arc, as it causes it to become disturbed and unstable. However, by applying a control gas in an inclined relation to the electrode near the end of the electrode, the arc is deflected at the end of the electrode and formed along the stream of the control gas, whereby the arc-generating position of the joint to be welded can be changed most effectively and stably.

Figure 2:
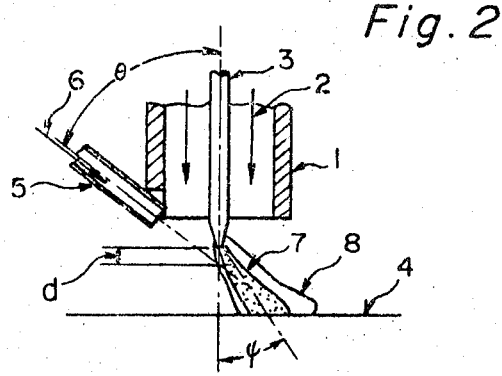
FIG. 2 is a schematic view showing the relation of an angle ($\theta$) formed between the control gas nozzle and the electrode, to an angle ($\psi$) of the arc deflected from the axis of electrode.
Figure 3:
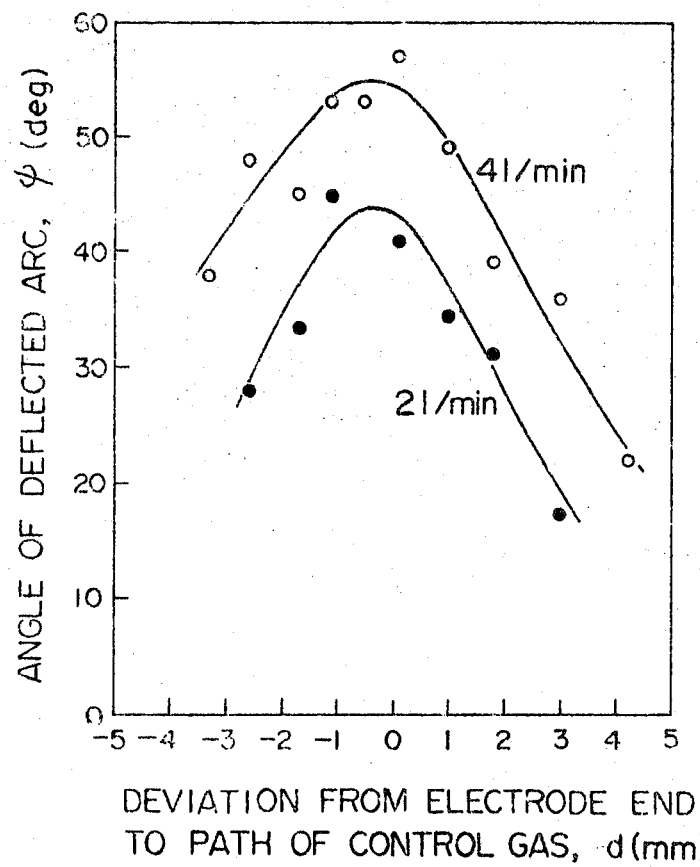
FIG. 3 is a graphic representation showing the relation of the deviation (d) between a path of the control gas and the end of the electrode, to the angle ($\psi$) of the arc deflected from the axis of electrode.

FIGS. 2 and 3 show the results of experiments on the influences of the deviation $d$ between the end of the electrode and a path of the control gas stream upon the deflecting angle $\psi$ of the arc. In the experiments, the inclining angle $\theta$ of the nozzle was about 60°, and the flow rate of the control gas was 4 liters/min. and 2 liters/min. respectively. The inside diameter of the shield gas nozzle was 12 mm. The flow rate of the shield gas was 10 liters/min. The control gas nozzle was a copper pipe having an inside diameter of 2.4 mm. The electrode used was a thoriated tungsten and having a diameter of 3.2 mm. The arc current was 100 A. The results shown in FIG. 3 demonstrate that the arc deflecting effect is the greatest when the control gas jet stream passes the end of the electrode. In other words, in order to deflect the arc at the desired angle, it is most effective to mount the control gas nozzle so that the control gas stream passes the end of the electrode and to incline the control gas nozzle to the electrode at an angle slightly larger than the desired angle taking into account the combination of the shield gas and the control gas. It is seen from FIG. 3 that the deflecting angle of the arc can be varied even when the flow rate of the control gas is changed.

One example of the inert gas arc welding of the consumable electrode type in accordance with the present invention will be described.

In this welding, the diameter of the wire was 1.6 mm, the arc current was 280 A, and the arc voltage was 31 V. The diameter of the shield gas nozzle was 25 mm, and the flow rate of the shield gas was 25 liters/min. A control gas was jetted out at a flow rate of 8 liters/min. from a control gas nozzle having a diameter of 2.4 mm so that it passed the end of the wire. The arc was inclined at the end of the wire, and deflected at an angle of about 35°.

As described above, according to the present invention, a control gas nozzle having a smaller inside diameter than the inside diameter of the shield gas nozzle is mounted in an inclined relation to the electrode and in such a manner that a stream of a control gas passes the end of the electrode. The arc is deflected from the electrode at the end of the electrode by the amount of momentum of the control gas jet stream from the nozzle, and an arc plasma is formed almost in a straight line fashion along the stream of the control gas by the thermal pinching effect.

One example of application of the control method mentioned above will be described.

By the control method of this invention, arc can be vibrated by jetting a stream of control gas intermittently, and this makes possible such an operation as weaving. This will be shown by the following experimental examples.

1. A control gas nozzle was fixed at an angle of 60° to an electrode, and the experiment was performed under the following conditions.

| | |
|---|---|
| Welding current | 100 A |
| Shield gas | 10 l/min. |
| Diameter of the shield gas nozzle | 20 mm |
| Control gas | pulse-like jet stream flowing 5 times a second (time of one jet stream 0.12 second, flow rate 3 liters/min.) |
| Diameter of the control gas nozzle | 2.4 mm |

The arc could be vibrated surely and stably between the position immediately beneath the electrode and the point which was at a deflecting angle of about 50° at most.

Figure 4:
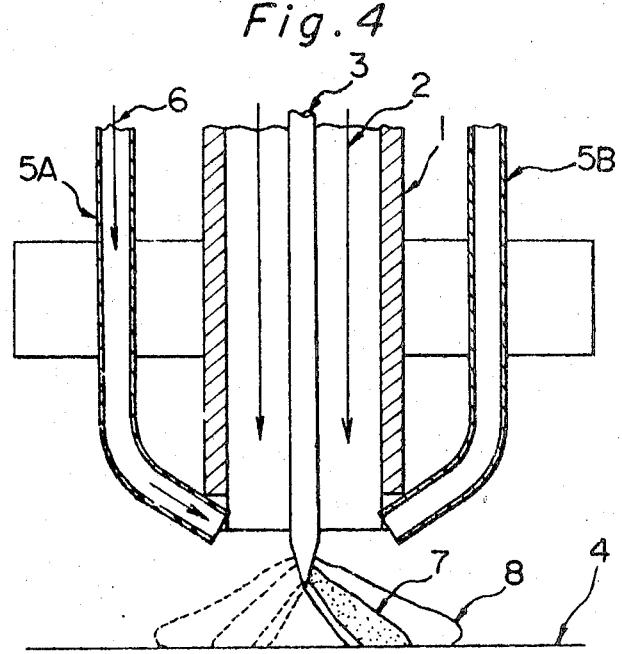
FIG. 4 is a schematic view showing a mechanism for vibrating the arc to left and right.
Figure 5:
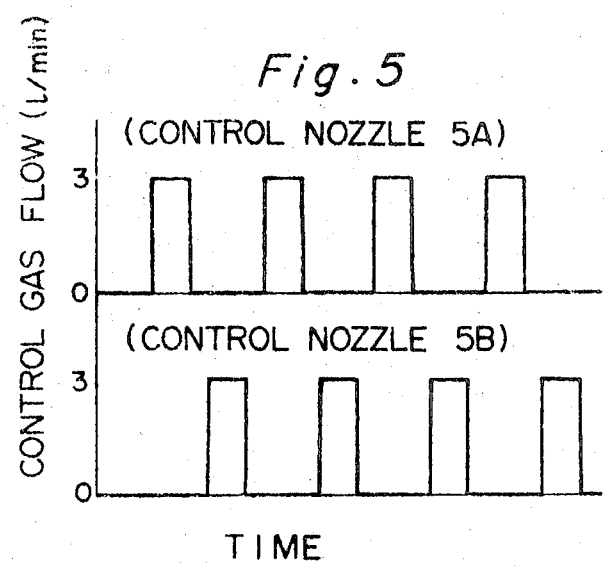
FIG. 5 is a time chart showing the state of the control gas stream intermittently flowing from the control gas nozzle.

2. The experiment was then performed after providing two control gas nozzles 5 A and 5 B symmetrically to each other with respect to the electrode, as shown in FIG. 4. Pulse jet streams of different phase were jetted out from the control gas nozzles 5 A and 5 B as shown in FIG. 5. The other conditions were the same as those of experiment (1) above. As a result, it was possible to vibrate the arc to left and right around the position immediately below the electrode.

In another embodiment of the controlling method of this invention, the arc can be rotated around the electrode. This embodiment is useful, for example, for welding an annular material to a flat plate. The rotation of the arc is effected by rotating the control gas nozzle around the electrode with its axial direction facing the end of the electrode. In this experiment, the control gas was jetted out at a flow rate of 5 liters per minute, and the control gas nozzle was rotated at a speed of 6 rpm, with the other conditions being maintained the same as those used in experiment (1) above. The arc rotated in the deflected state following the rotation of the control gas nozzle, and the locus of the arc-generating position of the joint described a circle. During the rotating movement of the arc, the deflecting angle of the arc did not change substantially from that in the stationary state, and the arc was stable.

Figure 6:
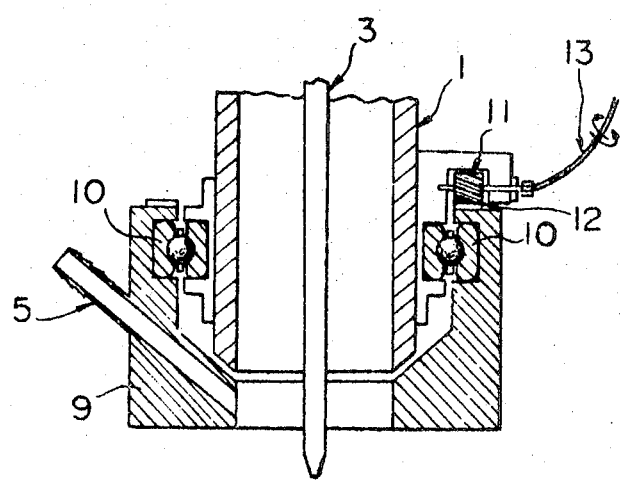
FIG. 6 is a view showing one example of a mechanism for rotating the control gas nozzle.

One example of a mechanism for rotating the control gas nozzle around the electrode is shown in FIG. 6. The control gas nozzle 5 is supported by an annular support 9 which is rotatably and concentrically secured to a shield gas nozzle 1 by means of a ball bearing 10. The support 9 is driven by a motor (not shown) through a rack 12 just above it, a pinion 11 fixed to the shield gas nozzle 1 and a flexible shaft 13.

While the above description has been directed to the application of the present invention to gas shield arc welding using an inert gas, the controlling method of this invention can be applied also to the case of using carbon-dioxide gas as a shield gas. It should be noted that various modifications of the present invention are possible, and the invention is not limited to the specific embodiments described so long as it does not deviate from the technical concept described in the specification and the appended claims.

What is claimed is:

1. A method of controlling the direction of an arc deflecting from the axial direction of an electrode in inert or carbon dioxide gas shielded electric arc welding, which comprises causing a control gas jet stream to flow past the end of an electrode of a welding torch such that the axial extension of the control gas jet stream intersects the axis of the electrode only at the end of the electrode, and varying the flow rate of the control gas jet stream.

2. The method of claim 1 wherein the arc is vibrated by causing the control gas to flow intermittently.

3. The method of claim 1 wherein the direction of the arc deflecting from the axial direction of the electrode is controlled by changing the direction of the control gas jet stream.

4. The method of claim 1 wherein the arc is rotated about the electrode as a center by changing the direction of the control gas jet stream about the electrode as a center.

5. The method of claim 1 wherein an inert gas is used as the control gas.

6. The method of claim 1 wherein the flow rate of the control gas jet stream is higher than the flow rate of the shield gas.

7. A welding apparatus for use in gas shield arc welding which comprises an electrode, a shield gas nozzle surrounding the electrode and at least one control gas nozzle located such that the axial extension of the control gas nozzle intersects the axis of the electrode only at the end of the electrode, thus deflecting the arc from the axial direction of the electrode by the jet stream of the control gas issued from the control gas nozzle.

8. The welding apparatus of claim 7 wherein two control gas nozzles are provided symmetrically to each other with respect to the electrode.

9. The welding apparatus of claim 7, which further includes a mechanism for rotating the control gas nozzle about the electrode as a center.

10. The welding apparatus of claim 7 which further includes a means for causing the control gas to flow intermittently.

* * * * *